(12) United States Patent
Tan et al.

(10) Patent No.: US 10,778,597 B1
(45) Date of Patent: Sep. 15, 2020

(54) ORCHESTRATION MANAGEMENT SYSTEM AND METHOD FOR MANAGING A RESOURCE POOL ACROSS MULTIPLE COMPUTING CLOUDS

(71) Applicant: VCE Company, LLC, Richardson, TX (US)

(72) Inventors: Michael Tan, Palo Alto, CA (US); Akshaya Mahapatra, San Jose, CA (US); Peng Liu, Milpitas, CA (US); Gilbert Lau, Cupertino, CA (US)

(73) Assignee: EMC IP Holding Company LLC, Round Rock, TX (US)

( * ) Notice: Subject to any disclaimer, the term of this patent is extended or adjusted under 35 U.S.C. 154(b) by 276 days.

(21) Appl. No.: 14/718,902

(22) Filed: May 21, 2015

(51) Int. Cl.
*H04L 12/911* (2013.01)
*H04L 29/08* (2006.01)

(52) U.S. Cl.
CPC .............. *H04L 47/70* (2013.01); *H04L 67/02* (2013.01); *H04L 67/10* (2013.01)

(58) Field of Classification Search
CPC .......... H04L 47/70; H04L 67/02; H04L 67/10
USPC ....................................................... 709/226
See application file for complete search history.

(56) References Cited

U.S. PATENT DOCUMENTS

| | | | |
|---|---|---|---|
| 2010/0199037 A1* | 8/2010 | Umbehocker | G06F 3/0604 711/113 |
| 2011/0126197 A1* | 5/2011 | Larsen | H04L 9/3213 718/1 |
| 2011/0126207 A1* | 5/2011 | Wipfel | H04L 9/3213 718/104 |
| 2011/0131315 A1* | 6/2011 | Ferris | G06Q 30/0601 709/224 |
| 2012/0096149 A1* | 4/2012 | Sunkara | G06F 9/5072 709/224 |
| 2012/0124211 A1* | 5/2012 | Kampas | G06F 9/50 709/226 |
| 2013/0238805 A1* | 9/2013 | Catrein | G06F 9/5072 709/226 |
| 2013/0297673 A1* | 11/2013 | McGrath | G06F 9/505 709/203 |
| 2013/0346619 A1* | 12/2013 | Panuganty | H04L 41/12 709/226 |
| 2014/0059226 A1* | 2/2014 | Messerli | G06F 9/5072 709/226 |

* cited by examiner

*Primary Examiner* — Umar Cheema
*Assistant Examiner* — Tony Williams
(74) *Attorney, Agent, or Firm* — Polsinelli PC (57) ABSTRACT

A multi-cloud orchestration system includes a computer executed set of instructions that communicates with multiple computing clouds and/or computing clusters each having one or more resources for executing an application. The instructions are executed to receive information associated with an application, allocate a resource pool to be used for executing the application in which the resource pool including at least one resource from each of the computing clouds and/or computing clusters. The instructions may be further executed to provision the resources to execute the application.

20 Claims, 6 Drawing Sheets

ORCHESTRATION MANAGEMENT SYSTEM AND METHOD FOR MANAGING A RESOURCE POOL ACROSS MULTIPLE COMPUTING CLOUDS

TECHNICAL FIELD

Aspects of the present disclosure relate to computing devices and, in particular, to a orchestration management system and method for managing resource pools spanning multiple computing clouds.

BACKGROUND

Cloud computing environments have been developed to provide services over a network, such as the Internet, in a manner that does not necessarily require intimate knowledge of logistical concerns as to how the service is provided. That is, due to resources being remote and remotely managed, often in a dedicated computing environment, users of the resources of a cloud computing environment may be alleviated from many logistical concerns, such as access to electrical power, failover events, reliability, availability, and the like. Additionally, resources provided by cloud computing environments may be relatively efficient due to their ability to share computing resources across multiple users (e.g., tenants), while delegating software development and maintenance costs to administrators of the cloud computing environment.

SUMMARY

According to one aspect of the present disclosure, a multi-cloud orchestration system includes a computer executed set of instructions that communicates with multiple computing clouds and/or computing clusters each having one or more resources for executing an application. The instructions are executed to receive information associated with an application, allocate a resource pool to be used for executing the application in which the resource pool including at least one resource from each of the computing clouds and/or computing clusters. The instructions may be further executed to provision the resources to execute the application.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

DETAILED DESCRIPTION

Embodiments of the present disclosure provide a system for managing a pool of resources used to execute an application, such as a web-based application, in which the resources are provided by multiple cloud computing environments. Although traditional cloud management systems, such as cloud portals, manage the distribution of applications over a single cloud computing environment, such systems are generally incapable of managing a pool of virtual and physical resources that are provided by multiple cloud computing environments. As such, these traditional cloud management systems are limited to deployment of web-based applications on a single cloud computing environment and thus, cannot utilize certain benefits that could be provided by the use of multiple cloud computing environments to form an optimized computing platform for execution of web-based applications. Embodiments of the multi-cloud orchestration system discussed herein provide a solution to this problem, among other problems, by using a multi-cloud orchestration system that coordinates the operation of resources from multiple cloud computing environments for execution of web-based applications in a manner that has not been heretofore recognized by traditional cloud management systems.

Cloud computing provides certain advantages over traditional computing approaches for several reasons. For one reason, users may be alleviated from various burdensome tasks typically associated with the management of physical computing resources, such as periodic software and/or hardware upgrades, bug fixes to software code or the hardware resources used to execute the software, access to reliable electrical power sources, and the like. Additionally, cloud computing provides an extensible system that can readily grow and/or shrink according to ongoing needs of the web-based applications executed on the cloud computing environment.

Computing clouds may include public clouds or private clouds. Private clouds generally refer to computing clouds that are essentially administered by the same entity that uses the computing cloud. Public clouds, on the other hand, generally refer to computing clouds administered by an entity that sells or leases its resources to users commonly referred to as tenants. Examples of such computing clouds include an Amazon Web Service™(AWS), an Amazon Elastic Compute Cloud (EC2™), Amazon Elastic Block Store (EBS™), and Google Coud™.

The public cloud computing environments often provide virtual resources on a lease-by-lease basis. That is, users (e.g., tenants) may be allocated resources based upon usage (e.g., data throughput, amount of memory used, etc.) and/or upon periodic service charges (e.g., monthly subscription fees). Also, certain cloud computing environments may provide certain features that other cloud computing environments do not provide. For example, some cloud computing environments may offer relatively little or no security (e.g., no substantial expectation of privacy with regard to information processed by the public cloud's resources), or a specified level of security at relatively higher costs (e.g., the privacy of information processed on the computing cloud is controlled to a specified extent (e.g., compliance level)). For another example, some cloud computing environments may be optimized for their computing (e.g., processing) capability (e.g., EC2™), while another cloud computing environment may be optimized for its memory storage capability (e.g., EBS™)

Management of cloud computing environments is generally provided by cloud management systems, commonly referred to as cloud portals. Cloud portals are computer executable applications that manage the operation of multiple resources in a cloud computing environment. These cloud portals provide a common interface for deploying applications and managing its infrastructure resources. Examples of such cloud portals may include a vCloud Automation Center (vCAC) software suite available from VMware Corporation (Palo Alto, Calif.), a VCE Cloud Management Portal software suite available from VCE LLC (Richardson, Tex.), and a Cisco Intelligent Automation For Cloud (CIAC) software suite available from Cisco Corporation (San Jose, Calif.). These conventional cloud portals provide a platform for coordinating or orchestrating the operation of multiple resources configured in a cloud computing environment that may, in many cases, span several different geographical locations and use multiple computing nodes, such as computing clusters, computing grids, converged infrastructures, and the like. In many cases, it would be beneficial to utilize certain resources from one computing cloud while utilizing the resources from another computing cloud in order to optimize the capabilities and efficiencies of a web-based application. However, currently available cloud portals, such as those discussed above, are not capable of managing resources that span multiple computing clouds.

The configuration of web-based applications on computing clouds is typically accomplished using resource pools. Resource pools generally refer to a group of resources (e.g., compute, storage, network resources, etc.) that are allocated for executing the web-based application. These conventional cloud portals do not provide for resource pool management that may span multiple computing clouds. As such, web-based applications have been heretofore limited in the efficiency and performance that could otherwise be obtained using multiple computing clouds to handle the needs of web-based applications.

Figure 1A:
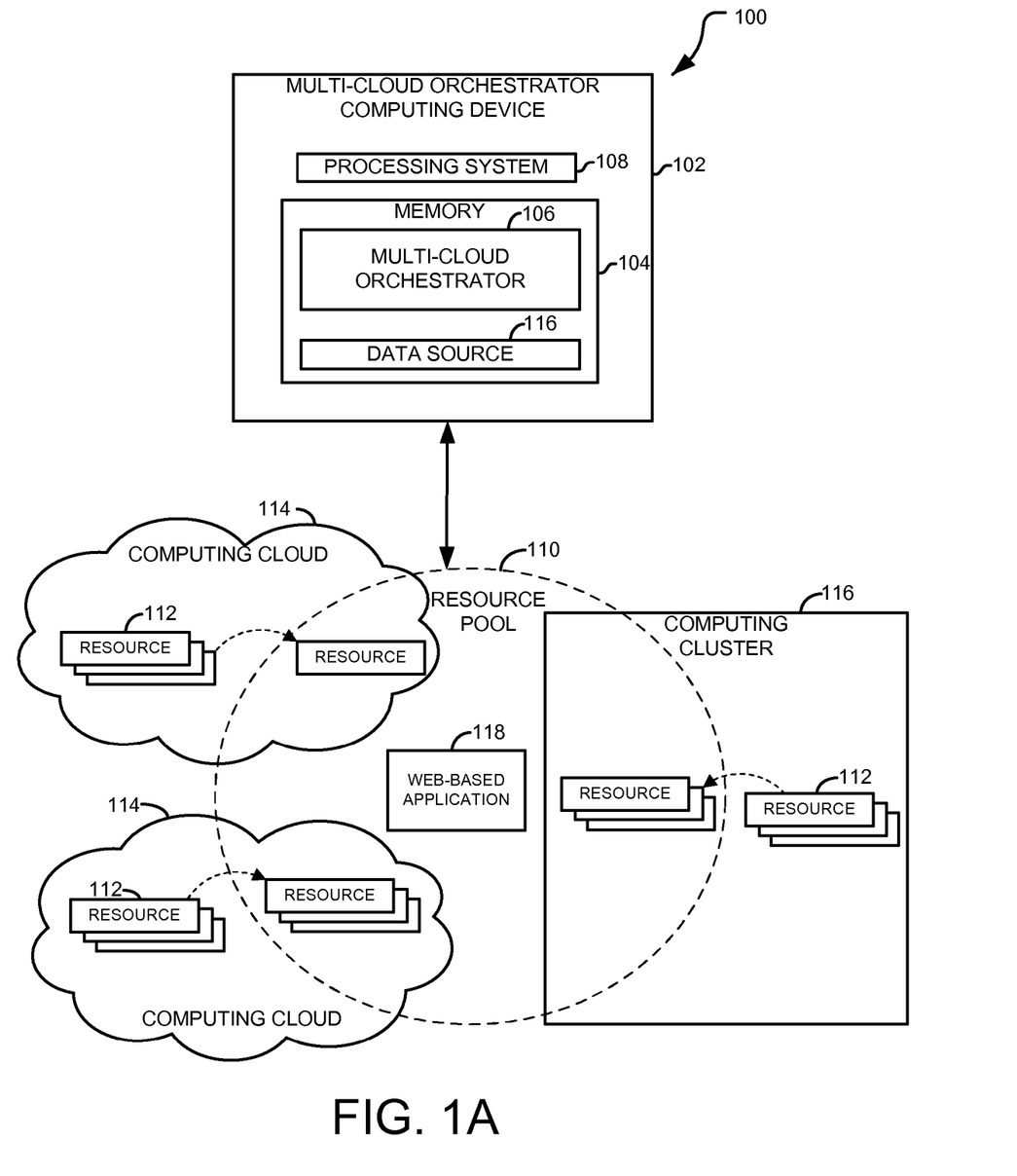
FIGS. 1A and 1B illustrate an example multi-cloud orchestration system according to one embodiment of the present disclosure.
Figure 1B:
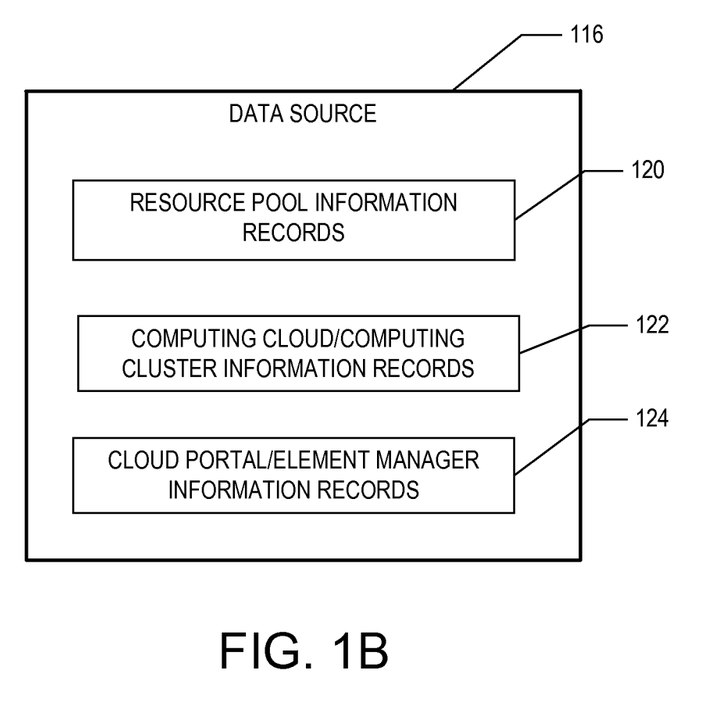

FIGS. 1A and 1B illustrate an example multi-cloud orchestration system 100 according to the teachings of the present disclosure. The multi-cloud orchestration system 100 addresses problems with conventional cloud orchestration systems among other benefits and solutions. The system 100 includes a multi-cloud orchestrator computing device 102 having a memory 104 for storing a multi-cloud orchestrator 106 using a processing system 108. As will be described in detail herein below, the multi-cloud orchestrator 106 generates and manages a resource pool 110 that includes multiple resources 112 from multiple computing clouds 114 and/or computing clusters 116 to be used to execute a web-based application 118 or other application.

In general, the multi-cloud orchestrator 106 generates and manages a resource pool 110 that may be used to execute a web-based application 118 that spans multiple computing clouds 114. Additionally, a web-based interface (e.g., RESTful interface, JSON interface, etc.) may be provided for direct management of a computing cluster 116 such that those computing clusters not directly managed by a cloud portal may be implemented to provide resources 112 for the resource pool 110. Information associated with the resources 112 of the resource pool 110 may be stored in a data source 116 such that the resources 112 may be added, edited, and/or deleted on an ongoing basis to manage how the web-based application 118 is executed across multiple computing clouds 114 and/or computing clusters 116. Embodiments of the multi-cloud orchestrator 106 may directly manage the resources of certain computing clouds 114 and computing clusters 116, and/or provide for third party management of the resources of certain computing clouds 114 and computing clusters 116 by communicating with a cloud portal or element manager, respectively, that manages the resources of that computing cloud 114 and computing cluster 116.

The computing clouds 114 include any type that provides resources 112 for execution of web-based applications 118. For example, a computing cloud 114 may include one that provides dedicated use of one or more resources 112 on a lease-by-lease basis. Examples, of such computing clouds may include the Amazon EC2™, Amazon AWS™, Google Cloud™, as well as other privately owned and managed computing clouds 114.

As opposed to localized, stand-alone computing structures, a computing cloud usually includes networked components which may be in one or more remotely configured computing systems that function in a collaborative manner to provide services sometimes over a diverse geographic region. A typical computing cloud 114 may include hardware resources, virtual resources (e.g., virtual objects provided by a virtualization environment), gateways for secure management of data, communication nodes for communication among the multiple computing nodes, and/or other devices that support the overall operation of the computing cloud 114.

The computing cluster 116 may be any type of multi-computing environment, such as a computing cluster, computing grid, blade array, and/or a converged infrastructure (CI), which may also be referred to as a unified computing system, a fabric-based computing system, and a dynamic infrastructure that provides resources for the execution of web-based applications 118. The resources 112 of the computing cluster 116 may include any type, such as hardware resources or virtual objects. Example hardware resources 112 of the computing cluster 116 may include any type of hardware that provides physical resources for the computing cluster 116 while the virtual objects include logical entities, such as virtual machines, virtual switches, and virtual storage units. Virtual objects may also include logical configuration constructs, such as storage partitions, port groups, virtual private clouds, virtual local area networks (LANs), and private virtual data centers (PVDCs).

The configuration of web-based applications on computing clouds and computing clusters is typically accomplished using resource pools. Resource pools generally refer to a group of resources (e.g., compute, storage, network resources, etc.) that are allocated for executing web-based applications. For example, a resource pool 110 may be established to dedicate certain resources 112 for use by the web-based application 118 such that, in the event of a peak loading event, additional resources 112 may be provisioned to mitigate the workload level of currently provisioned resources in a timely manner. In this case, the resources 112 may be previously vetted (e.g., qualified) for use prior to their being needed such that the time required to make them operational is reduced.

When requests are made to manage (e.g., provision, modify, de-provision) a resource 112, the multi-cloud orchestrator 106 identifies a particular computing cloud 114 or computing cluster 116 that provides that resource to be managed and directs the request to that computing cloud 114. The multi-cloud orchestrator 106 may include logic to, upon receiving a request to manage or edit a particular resource, determine which computing cloud 114 or computing cluster 116 that the resource 112 is part of, and communicate with the computing cloud 114 or computing cluster 116 to manage the operation of the resource 112. For example, when the multi-cloud orchestrator 106 receives a request to modify a particular resource 112 due to some reason, such as increasing an amount of its allocated memory, it may access the cloud portal/element manager information records 124 to obtain addressing information associated with a cloud portal or element manager, and communicate with that cloud portal or element manager to facilitate modification of that particular resource 124.

The multi-cloud orchestrator 106 may allocate resources 112 to the resource pool 110 according to a particular resource specified in the request, or the multi-cloud orchestrator 106 automatically select resources 112 to be included in the resource pool 110 according to one or more criteria associated with the resource 112. In the former case, a request to allocate a new resource to the resource pool 110 may specify the identity of a particular resource 112 to be allocated. In the latter case, a request to allocate a new resource to the resource pool 110 may include certain criteria that the multi-cloud orchestrator 106 uses to select which computing cloud 114 computing cluster 116, and/or which resource 112 in that computing cloud 114 or computing cluster 166 is to be allocated. For example, a request to allocate a new resource may specify a processing speed criterion, while having a cost index criterion that is below a certain specified level. When the multi-cloud orchestrator 106 receives such a request, it may access cloud portal/ computing cluster information records 122 to identify any resources 112 that meet or exceed the specified processing speed and cost criteria, and select those resources to be allocated to the resource pool.

In one embodiment, the multi-cloud orchestrator 106 receives requests to manage resources 112 using a standardized, common format, and translates those requests into a unique format to be understood by the resources 112 and/or cloud portals 304 or element managers 308 (See FIG. 3) that control the resources 112. In many cases, each computing cloud 114 may be controlled by a cloud portal 304 that has an interface that may be different relative to other interfaces. Additionally, each computing cluster 116 may be controlled using an element manager 308 that also has a unique interface. Thus, the multi-cloud orchestrator 106 determines which cloud portal 304 or computing cluster 116 is to receive the request and translates the request into a format suitable for use by that cloud portal 304 or element manager 308.

The multi-computing cloud orchestrator 106 may receive requests having any suitable format. The request has a standardized format and has a structure to include all information necessary for managing resources 112 from multiple computing clouds 114 and/or computing clusters 116. In one embodiment, the request has an extensible markup language (XML) format. An example request for managing a resource 112 having a standardized format is shown herein below:

vrtualmachine{ tomcat1 :
ipAddress: 43.250.3.56,
network: networkA
memory: 8 GB
CPU: 8 MHz
}
application{ tomcat1 :
target: 'https://vb7834.lab.virtual/tomcat1'
package: 'https:/app.repo.xyz/tomcat'
installation Folder: 'C:\\Program Files\Apache\Tomcat'
}

The particular request shown instructs the multi-cloud orchestrator 106 to allocate a virtual machine resource 112 named 'tomcat1', to be allocated for use at IP address '43.250.3.56', using 'networkA', and having a memory capacity of 8.0 Giga-bytes, and a minimum processing speed of 8.0 Mega-Hertz. The request also instructs the multi-cloud orchestrator 106 to install an Apache Tomcat™ application on that resource, whose target is located at 'https://vb7834.lab.vceivirtual/tomcat1', whose post-installation package is located at 'https:i/app.repo.xyz/tomcat', and installation folder is located at 'C:\\Program Files\Apache\Tomcat'. Although only one example request is shown and described herein, it should be understood that other embodiments of requests may include additional, different, and/or fewer fields than the one shown herein without deviating from the spirit and scope of the present disclosure.

The data source 116 stores resource pool information records 120, computing cloud/computing cluster information records 122, and cloud portal/element manager information records 124. The resource pool information records 120 include various elements of information associated with a list of the resources 112 that are part of a resource pool 110, such as the status (e.g., operational status, loading condition(s), leasing information, etc.) of each resource 112. For example, when a resource 112 is added to the resource pool 110, information associated with that resource 112 will be stored in the resource pool information records 120, and conversely, when a resource 112 is removed from the resource pool 110, information associated with that resource 112 will be deleted from the resource pool information records 120.

The computing cloud/computing cluster information records 122 include information associated with the available resources 112 from each computing cloud 114 and/or computing cluster 116. For example, the computing cloud/ computing cluster information records 122 may include information about how many resources 112 in a certain computing cloud 114 are available, the cost to use each resource 112, and the expected performance level of each resource 112. The cloud portal/element manager information records 124 include information associated with any cloud portals and/or element managers to be used for communicating with the resources 112. For example, the cloud portal/element manager information records 124 may include information associated with addresses (e.g., uniform resource locator (URL) addresses) used to access any cloud portals and/or element managers. Additionally, the cloud portal/element manager information records 124 may include information associated with any previously established contracts or terms of service (TOS) regarding how the resources 112 may be used.

The multi-cloud orchestrator computing device 102, computing clouds 114, and computing clusters 116 communicate with one another in any suitable manner, such as using wireless, wired, and/or optical communications. In one embodiment, the multi-cloud orchestrator computing device 102, computing clouds 114, and computing clusters 116 communicates with one another using a communication network, such as the Internet, an intranet, or another wired and/or wireless communication network. In another embodiment, the multi-cloud orchestrator computing device 102, computing clouds 114, and computing clusters 116 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the multi-cloud orchestrator computing device 102, computing clouds 114, and computing clusters 116 may communicate with one another without the use of a separate and a distinct network. Additionally, other embodiments contemplate that the modules employed by the multi-cloud orchestrator 106 are executed by a computing device (e.g., resource) configured on a computing cloud 114 or computing cluster 116.

Figure 2:
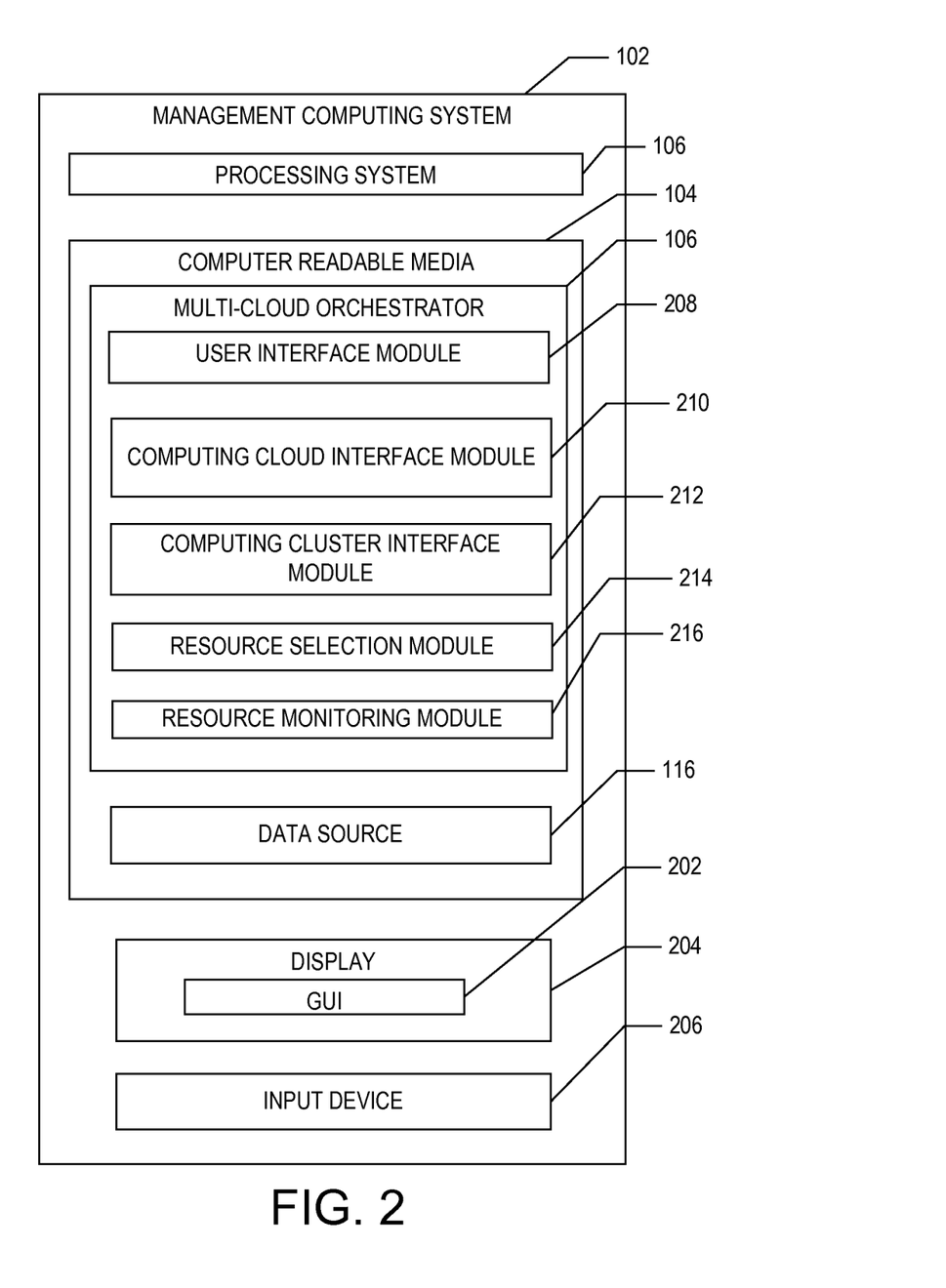
FIG. 2 illustrates a block diagram of an example multi-cloud orchestrator executed on the computing device according to one embodiment of the present disclosure.

Referring now in more detail to FIG. 2, a block diagram of an example multi-cloud orchestrator 106 executed on the multi-cloud orchestrator computing device 102 is depicted according to one aspect of the present disclosure. The multi-cloud orchestrator 106 is stored in a memory 104 (i.e., computer readable media) and is executed on a processing system 106 of the multi-cloud orchestrator computing device 102. According to one aspect, the multi-cloud orchestrator computing device 102 also includes a graphical user interface (GUI) 202 displayed on the display 204, such as a computer monitor for displaying data. The multi-cloud orchestrator computing device 102 may also include an input device 206, such as a keyboard or a pointing device (e.g., a mouse, trackball, pen, or touch screen) to enter data into or interact with the GUI 202. According to one aspect, the multi-cloud orchestrator 106 includes instructions or modules that are executable by the processing system 106 as will be described in detail herein below.

The memory 102 includes volatile media, nonvolatile media, removable media, non-removable media, and/or another available medium. By way of example and not limitation, non-transitory memory 102 comprises computer storage media, such as non-transient storage memory, volatile media, nonvolatile media, removable media, and/or non-removable media implemented in a method or technology for storage of information, such as computer readable instructions, data structures, program modules, or other data.

A user interface module 208 displays multi-cloud resource information to be used for creating and managing a resource pool that spans multiple, differing computing clouds 114. For example, the user interface module 208 may display some, most, or all resources 112 that are available to be included in a resource pool 110, and may receive user input for adding or deleting resources 112 from the resource pool 110. Additionally, the user interface module 208 may receive user input associated with selection of a particular resource 112, and in response, display additional detailed information about that selected resource 112 for managing or editing various parameters associated with that selected resource 112.

A computing cloud interface module 210 communicates with a computing cloud 114 to manage one or more of its resources 112. In most cases, access to the resources 112 of a computing cloud 114 are provided by a cloud portal; however, each may employ a certain protocol and/or a unique set of procedures to be followed in order to manage its resources. For example, certain cloud portals may require entry of certain unique parameters, such as selection of a minimum amount of resources, selection of certain resources based upon the type of web-based application 118 to be executed, a compliance level (e.g., a payment card industry (PCI) compliance level or a Health Insurance Portability and Accountability Act (HIPAA) compliance level) to be maintained for the resources, user account management associated with the user (e.g., tenant) of the resources, and the like. The computing cloud interface module 210 ensures that the selection of resources to be allocated for use by the multi-cloud orchestrator 106 comply with any particular protocol and/or set of procedures required for using the resources 112 of its respective computing cloud 114. For example, the computing cloud interface module 210 may, upon a request to add resources to the resource pool 110, ensure that the resources of a particular computing cloud 114 included in the request are available and that they meet certain criteria (e.g., does the user account allow using those type of resources, does a compliance level associated with the user account allow the use of the requested resources, etc.) established by the computing cloud 114 for using those resources 112.

A computing cluster interface module 212 communicates with a computing cluster (e.g., a computing grid, a CI, a unified computing system, a fabric-based computing system, a dynamic infrastructure, etc.) to manage one or more of its resources. In one embodiment, the computing cluster interface module 212 translates requests for managing the resources 112 of a computing cluster 116 to a network-based communication format, such as a REST interface or a JSON interface in which the each resource 112 to be managed includes a resource interface module configured on the resource to convert the network-based communication format to instructions having a format suitable for communicating with its respective resource 112.

The computing cluster interface module 212 and associated resource interface module configured on the resource may be generated according to the type of resource to be managed. Because a computing cluster 116 may include resources 112 that differ in their capabilities, structure, operation, and/or purpose, the computing cluster interface module 212 may be generated in a manner to handle the particular characteristics of its respective resource 112 such that it may be effectively managed. Additional details of an example computing cluster interface module 212 will be described in detail herein below.

A resource selection module 214 provides for automatic selection of resources 112 to be added to the resource pool 110 according to one or more criteria selected by the user. When a request specifies one or more criteria to be provided by the resource, the resource selection module 214 automatically selects one or more resources 112 to be included in the resource pool 110 according to criteria specified by the user. Example criteria may include a minimum processing speed to be maintained by the resource 112, a minimum amount of memory used by the resource 112, a minimum compliance level to be maintained by the resource 112, and the like. For example, when a request to add a resource 112 to the resource pool 110 is received in which the request includes a criterion specifying that a HIPAA compliance level be maintained by the resource 112, the resource selection module 214 searches to find a resource 112 having the HIPAA compliance level, and adds that resource to the resource pool 110.

A resource monitoring module 216 monitors the health of the resources 112 included in the resource pool 110. In one embodiment, the resource monitoring module 216 periodically and/or aperiodically polls each resource 112 to determine any failures of the resources 112. For example, the resource monitoring module 216 may monitor the performance of each resource by communicating with an application executed on the computing resource, such as a task manager that continually monitors processing load and memory usage, to obtain performance characteristics of each resource. As yet another example, the resource monitoring module 216 may monitor a network analyzer, such as a sniffer device, to measure a throughput rate of data on a communication link to determine a throughput rate for that communication link. In another embodiment, the resource monitoring module 216 receives exception events received from the computing resources 112 to determine any failures in the computing resources 112. For example, the resource monitoring module 216 may receive exception event messages transmitted from communication-based computing resource (e.g., a router) that is configured to generate and transmit exception events according to a simple network management protocol (SNMP).

When a failure is detected by the resource monitoring module 216, one or more remedial actions may be performed. For example, when a failure is detected by the resource monitoring module 216, an alert message (e.g., audible or visual) may be generated and displayed for the user via the user interface module. As another example, when a failure is detected by the resource monitoring module 216, the workload of the failed resource 112 may be automatically migrated to another functional resource 112. That is, the resource monitoring module 216, upon detecting a failure of a resource 112, identify another resource 112 having essentially similar performance characteristics, provision that resource 112, and migrate some, most, or all processes executed on the failed resource 112 to the functional resource 112.

It should be appreciated that the modules described herein are provided only as examples, and that the multi-cloud orchestrator 106 may have different modules, additional modules, or fewer modules than those described herein. For example, one or more modules as described in FIG. 2 may be combined into a single module. As another example, certain modules described herein may be encoded on, and executed on other computing systems, such as on one of the resources 112 of a computing cloud 114 or a computing cluster 116.

Figure 3:
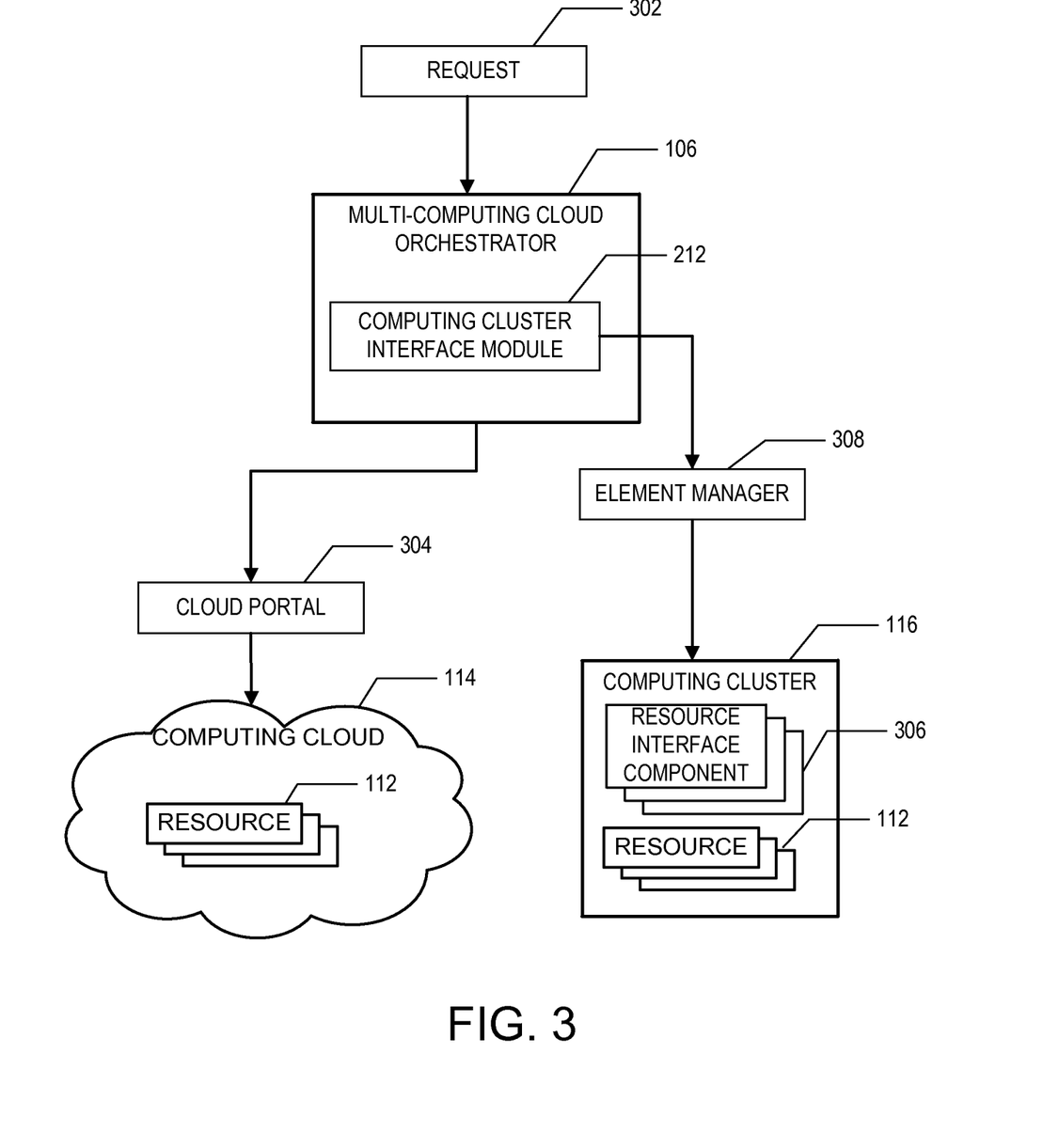
FIG. 3 illustrates an example implementation of a multi-cloud orchestrator that is used to manage a pool of resources that span multiple computing clouds and computing clusters according to one embodiment of the present disclosure.

FIG. 3 illustrates an example implementation of a multi-cloud orchestrator 106 that may be used for generating and maintaining a resource pool 110 that spans multiple computing clouds 114 and/or computing clusters 116. For example, computing cloud 114 may be the Amazon AWS™ computing cloud, and the computing cluster 116 may be a CI. Although only one computing cloud 114 and one computing cluster 116 are shown, it should be understood that the multi-cloud orchestrator 106 may generate and maintain resource pools 110 that span any quantity of computing clouds 114 and/or computing clusters 116.

The multi-cloud orchestrator 106 manages the resources 112 of resource pools 110 using a request 302, which may be generated by a user, such as from the GUI 206 of the multi-cloud orchestrator computing device 102. The request 302 may be any suitable type that includes information for requesting that a desired operation be performed for managing the resource 112 of a resource pool. In one embodiment, the request 302 includes a standardized format, such as described above, that can be translated into a form suitable for use by any computing cloud 114 or computing cluster 116.

When the multi-cloud orchestrator 106 receives the request 302 to provision a resource 112 to be included in a resource pool 110, it determines which computing cloud 114 or computing cluster 116 is to provide the requested resource 112. In one case, the request may include information associated with a particular resource 112 to be provisioned. In another case, the request may include one or more criteria that is to be used by the multi-cloud orchestrator 106 for automatically selecting a resource 112 according to the specified criteria.

If a resource 112 from the computing cloud 114 is selected, the multi-cloud orchestrator 106 may translate the request into a form suitable for use by that computing cloud 114. The multi-cloud orchestrator 106 may communicate directly with the resource 112 in the computing cloud 114 for performing its configuration, or may communicate with the resource 112 through a cloud portal 304 that is adapted for managing the resource 112. Certain embodiments that utilize a cloud portal 304 for provisioning the resource may provide certain advantages in that the cloud portal 304 often includes logic for automatically handling conditional logic, such as failed provisioning requests such that the multi-cloud orchestrator 106 may be alleviated from providing such logic.

If the computing cluster 116 is selected, the multi-cloud orchestrator 106 translates the received request into a form suitable for communicating with a resource 112 on the computing cluster 116. In one embodiment, communication between the multi-cloud orchestrator 106 and resources 112 of the computing cluster 116 is accomplished using a web-based interface (e.g., a RESTful interface). That is, the multi-cloud orchestrator 106 may generate a computing cluster interface module 212 that translates the request 302 to conform to a web-based protocol, and a resource interface component 306 that translates the request from a web-based protocol to one or more application program interface (API) messages to be used for managing the resource 112. In other embodiments, the multi-cloud orchestrator 106 may use other network-based protocols, such as the JSON protocol, for communicating with the resources 112 of the computing cluster 116.

When the resource interface components 306 are generated by the multi-cloud orchestrator 106, they may be installed on a computing device local to the resources 112 of the computing cluster 116 to be managed. In one embodiment, the resource interface components 306 are installed on one or more resources 112 of the computing cluster 116 in which the one or more resources 112 are dedicated to execution of the resource interface components 306. The one or more resources 112 each include a memory for storing the resource interface component 306 and a processing system for executing the stored resource interface components 306.

In one embodiment, multiple computing cluster interface modules 212 may be provided to interface with multiple differing types of resources of a computing cluster 116 to be managed. In another embodiment, the computing cluster interface module 212 may be included as a modular software component (e.g., a plug-in, an add-on, an extension, etc.) to the multi-cloud orchestrator 106. That is, the computing cluster interface module 212 may be structured in a manner to be integrated with the multi-cloud orchestrator 106 such that the computing cluster interface module 212 includes one or more APIs that are provided to the computing cluster interface module 212 for transmitting information such as status messages, and receiving control messages to be used for controlling the resources 112.

The computing cluster interface module 212 may communicate with the resource 112 directly, or through an element manager 308 typically used for its management.

Examples of element managers 308 that the resource interface component may communicate with for controlling the operation of the resource may include, but not limited to, a Cisco Unified Computing System (UCS) manager provided by Cisco Systems, Inc., of San Jose, Calif., and a VMware Virtual Center provided by VMware Corporation, of Palo Alto, Calif.

Additionally, the computing cluster interface module 212 may determine which element manager is to be used for managing the resource 112, and translates the message to a form suitable for communicating with the selected element manager. For example, if the computing cluster interface module 212 receives a request to manipulate a virtual machine configured in the compute sub-system of a CI having a virtualization environment, it may translate the request to a form compatible with the VMware Virtual Center element manager™, and transmit the translated message to that element manager. The same process may be repeated for other resources 112 managed by other element managers.

If the resource interface components 306 include a RESTful interface, one or more resource interface components 306 may be generated for each resource 112 to be managed by the cloud portal 106. For example, one resource interface component 306 may include a REST-based endpoint used for creating (e.g., provisioning) the resource, another resource interface component 306 may include a REST-based endpoint used for removing (e.g., de-provisioning) the resource 112, and another resource interface component 306 may include a REST-based endpoint for editing (e.g., modifying) the resource 112.

Although FIG. 3 illustrates one example implementation of a multi-cloud orchestrator 106 that may be used for generating and maintaining a resource pool 110 that spans multiple computing clouds 114, other embodiments may be include additional, fewer, or different components than what is shown herein without departing from the spirit and scope of the present disclosure. For example, the multi-cloud orchestrator 106 may communicate directly with the resources 112 in the computing cloud 114 and computing cluster 116 without the use of any cloud portals 304 or element managers 308. For another example, the resource interface components 306 may be installed in other locations, such as externally from the computing cluster 116.

Figure 4:
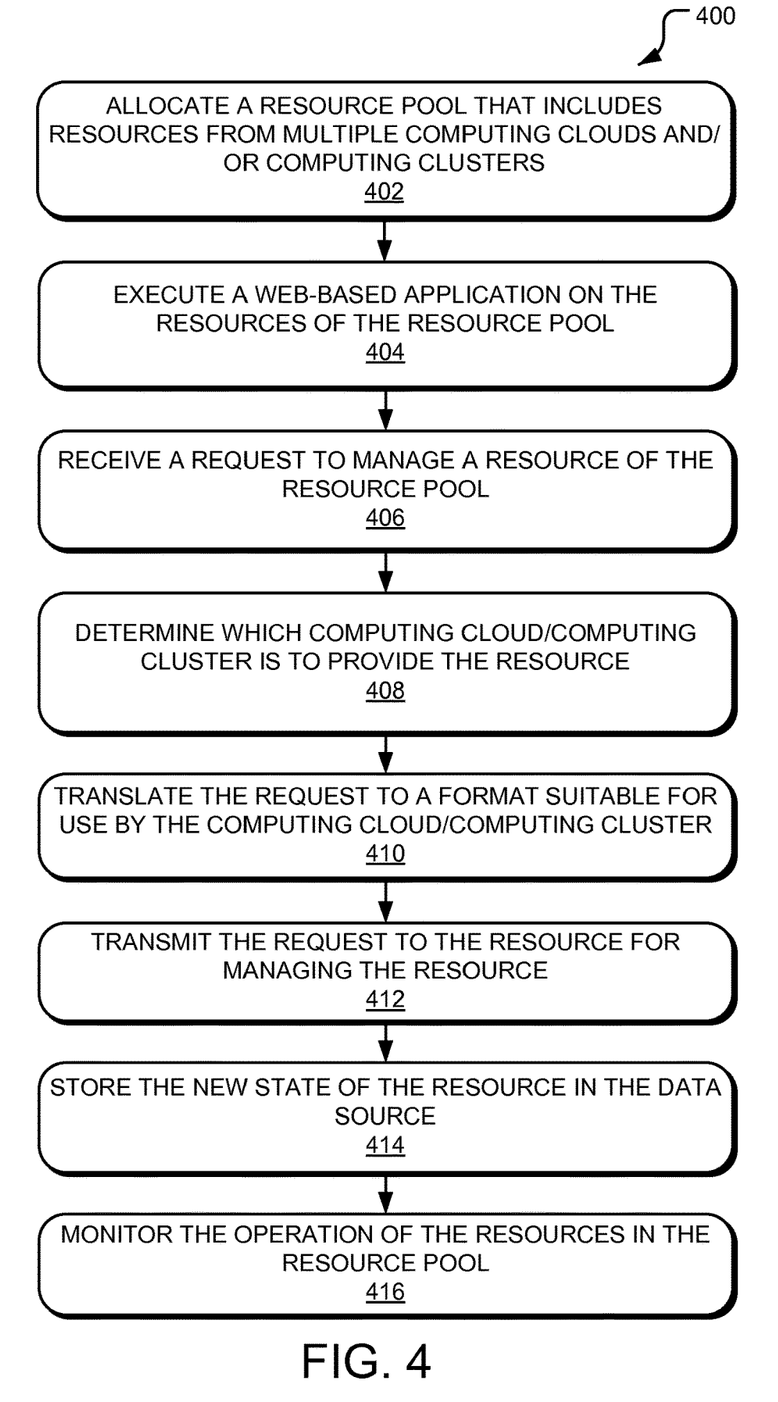
FIG. 4 illustrates an example process that may be performed by the multi-cloud orchestrator according to one embodiment of the present disclosure.

FIG. 4 illustrates an example process that may be performed by the multi-cloud orchestrator 106 to generate and manage resource pools using multiple computing clouds according to one embodiment of the present disclosure.

In step 402, the multi-cloud orchestrator 106 allocates a resource pool 110 that includes resources 112 from multiple computing clouds 114 and/or computing clusters 116. That is, at least two or more resources 112 of a computing cloud 114 and/or a computing cluster 116 is configured for use with the multi-cloud orchestrator 106. Additionally, resource interface components 306 may be configured on the computing cluster 116 for individual management of the resources 112 of the computing cluster 116 using the multi-cloud orchestrator 106. The multi-cloud orchestrator 106 may allocate the resource pool 110 by generating a resource pool information record 120 that includes information for each resource 114 allocated to that pool.

For example, it may be determined that several resources 112 from the EBS™ computing cloud 114 may be deployed due to their enhanced storage capabilities, and that several resources 112 from the EC2™ computing cloud 114 may be deployed due to their enhanced compute capabilities. As such, the multi-cloud orchestrator 106 may access the cloud portal/element manager information records 124 to obtain addressing information (e.g., a uniform resource locator (URL) address) associated with any cloud portals 304 used to manage the EBS™ and EC2™ computing clouds 114. Thereafter, a web-based application 118 may be launched on the resources 114 of each of the computing clouds 114 and/or computing clusters 116 in step 404.

In step 406, the multi-cloud orchestrator 106 receives a request to manage a resource 112 in the resource pool 110. The request may include information for adding the resource to the resource pool, removing the resource from the resource pool, or editing or modifying a resource included in the resource pool. In one embodiment, the request comprises a standardized format that may be processed by the multi-cloud orchestrator 106 regardless of the computing cloud 114 the request is directed to. For example, the request 302 may be formatted according to an extensible markup language (XML) format, and encapsulated in a web services description language (WSDL) format or other suitable interface definition language.

In step 408, the multi-cloud orchestrator 106 determines which computing cloud 114 or computing cluster 116 that is to be used for providing the resource 112. In one example, the resource is manually determined; that is, the request 302 specifies which computing cloud 114 or computing cluster 116 that is to provide the resource 112. In another example, the multi-cloud orchestrator 106 automatically determines the resource to be used; that is, the request 302 may include one or more criteria specifying certain performance criteria to be maintained by the resource 112. In such a case, the multi-cloud orchestrator 106 compares the criteria with performance information stored in the cloud portal/element manager information records 124 to identify a suitable resource 112 to be used.

In step 410, the multi-cloud orchestrator 106 translates the request 302 into a form suitable for use by the selected resource 112. In one embodiment, the request 302 is formatted to communicate directly with the resource 112. In another embodiment, the request 302 is formatted to communicate with a management application, such as a cloud portal 304 that manages resources in the computing cloud 114, or an element manager 308 that manages resources in a computing cluster 116. In certain embodiments, use of a cloud portal 302 or an element manager 308 may provide certain benefits, such as utilizing various error recovery techniques (e.g., exception handling capability, failed request handling, etc.) inherently provided by the cloud portal 302 or element manager 308, thus allowing the multi-cloud orchestrator 106 to perform relatively higher level management tasks.

In step 412, the multi-cloud orchestrator 106 transmits the translated request 302 to the identified resource 112. In response, the resource 112 is provisioned according to the request 302 and made available for use by a web-based application 118. Thereafter, the multi-cloud orchestrator 106 stores the new state of the resource in the resource pool information records 120 in step 414.

In step 416, the multi-cloud orchestrator 106 monitors the operation of the resources 112 in the resource pool 110. The multi-cloud orchestrator 106 may communicate with the cloud portal 302 and/or element managers 308 associated with each resource on a periodic basis or an aperiodic basis to receive status information associated with each resource 112 in the resource pool 110 and perform one or more remedial actions when the performance level of a resource 112 goes below a specified threshold level. For example, when the multi-cloud orchestrator 106 receives information that a particular resource 112 is operating at, or near peak capacity, it may provision one or more additional resources 112 to perform at least a portion of the workload performed by the overloaded resource 112.

The previous steps may be repeatedly performed for continual management and monitoring of the resources 112 of a resource pool 110 involving multiple computing clouds 114 and/or computing clusters 116. Nevertheless, when use of the multi-cloud orchestrator 106 is no longer needed or desired, the process ends.

Although FIG. 4 describes one example of a process that may be performed by the multi-cloud orchestrator 106, the features of the disclosed process may be embodied in other specific forms without deviating from the spirit and scope of the present disclosure. For example, the multi-cloud orchestrator 106 may perform additional, fewer, or different operations than those operations as described in the present example. As another example, the steps of the process described herein may be performed by a computing system other than the multi-cloud orchestrator computing device 102, which may be, for example, one or more of the resources 112 of the cloud portal 302, one or more of the resources 112 of a computing cluster 116.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 5:
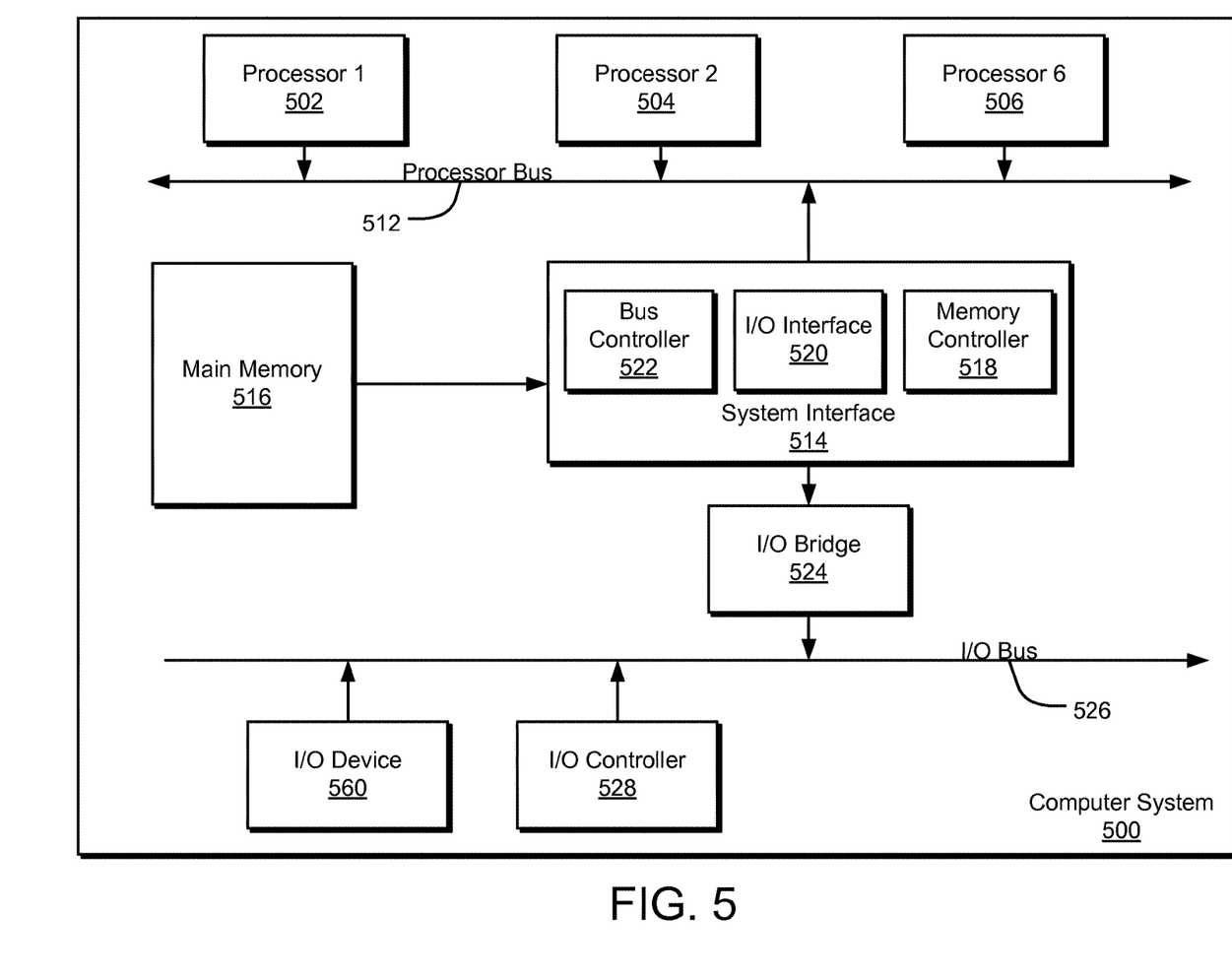
FIG. 5 is a block diagram illustrating an example of a computing device or computer system which may be used in implementing the embodiments of the present disclosure.

For example, FIG. 5 is a block diagram illustrating an example of a host or computer system 500 which may be used in implementing the embodiments of the present disclosure. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 513 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system for managing resources across multiple computing clouds, the system comprising:
    a computing device in communication with a plurality of computing environments each having one or more resources for executing an application and comprising at least one memory for storing instructions that are executed by at least one processor to:
        store an information record comprising at least one of a list of available resources of the plurality of computing environments, a cost of using each available resource, or an expected performance level of each available resource;
        receive information associated with the application, the information including a regulatory compliance requirement;
        allocate a resource pool to be used for executing the application based on the information record, the resource pool comprising a first resource from a computing cloud and a second resource from a computing cluster, one of the first resource and the second resource operating within the regulatory compliance requirement;
        generate and install, on a device local to the second resource, a resource interface to receive and translate provisioning requests for the second resource; and
        provision the first resource and the second resource to execute the application, comprising:
            receive a first request to provision the first resource and a second request to provision the second resource, at least one of the first request or the second request including performance criteria for selecting a resource;
            access cloud information records to identify a plurality of resources of the computing cloud and the computing cluster fulfilling the performance criteria;
            translate the first request into a format suitable for use by the computing cloud; and
            translate the second request into a format suitable for use by the computing cluster, the format of the translated first request different than the translated format of the second request;
            wherein one of the translated first request or translated second request includes a resource identifier for the resource fulfilling the performance criteria.

2. The system of claim 1, wherein the instructions are further executed to provision the first resource using a cloud portal, the format of the first request comprising an interface format of the cloud portal.

3. The system of claim 1, wherein the instructions are further executed to allocate a third resource of a second computing cluster to be included in the resource pool and to provision the third resource to execute the application, the third resource provisioned according to a third request to provision the third resource, the format of the third request comprising an interface format of the second computing cluster.

4. The system of claim 3, wherein the instructions are further executed to communicate with the third resource using a web-based interface comprising the interface format.

5. The system of claim 3, wherein the instructions are further executed to communicate with the third resource using an element manager, the interface format comprising the interface format of the element manager.

6. The system of claim 1, wherein the instructions are further executed to:
    receive a third request to add a third resource to the resource pool;
    identify which of the first computing cloud or the computing cluster is to provide the third resource; and
    provision the third resource of the identified computing cloud or the computing cluster to execute the application.

7. The system of claim 6, wherein the instructions are further executed to identify the third resource using resource information specified in the third request, the resource information comprising unique identifying information associated with the third resource.

8. A method for managing resources across multiple computing clouds, the method comprising:
    storing, using instructions stored in at least one memory and executed by at least one processor, an information record comprising at least one of a list of available resources of the plurality of computing environments, a cost of using each available resource, or an expected performance level of each available resource;
    receiving, using the instructions stored in at least one memory and executed by at least one processor, information associated with an application, the information including a regulatory compliance requirement;
    allocating, using the instructions executed by a processor, a resource pool to be used for executing the application based on the information record, the resource pool comprising a first resource from a computing cloud and a second resource from a computing cluster of the plurality of computing environments, one of the first resource and the second resource operating within the regulatory compliance requirement;
    generating and installing, on a device local to the second resource, a resource interface to receive and translate provisioning requests for the second resource; and
    provisioning, using the instructions executed by a processor, the first resource and the second resource to execute the application, comprising:
        receiving a first request to provision the first resource and a second request to provision the second resource, at least one of the first request or the second request including performance criteria for selecting a resource;

accessing cloud information records to identify a plurality of resources of the computing cloud and the computing cluster fulfilling the performance criteria;

translating the first request into a format suitable for use by the computing cloud; and translating the second request into a format suitable for use by the computing cluster, the format of the translated first request different than the format of the translated second request;

wherein one of the translated first request or translated second request includes a resource identifier for the resource fulfilling the performance.

9. The method of claim 8, further comprising provisioning the first resource using a cloud portal, the format of the first request comprising an interface format of the cloud portal.

10. The method of claim 8, further comprising allocating a third resource of a second computing cluster to be included in the resource pool and provisioning the third resource to execute the application, the third resource provisioned according to a third request to provision the third resource, the format of the third request comprising an interface format of the second computing cluster.

11. The method of claim 10, further comprising communicating with the third resource using a web-based interface comprising the interface format.

12. The method of claim 11, further comprising communicating with the third resource using an element manager, the interface format comprising the interface format of the element manager.

13. The method of claim 8, further comprising:
receiving a third request to add the third resource to the resource pool;
identifying which of the computing cloud or the computing cluster is to provide the third resource; and
provisioning the third resource to execute the application.

14. The method of claim 13, further comprising identifying the third resource using resource information specified in the third request, the resource information comprising unique identifying information associated with the third resource.

15. A non-transitory computer-readable medium storing instructions which, when executed by a computer configured for managing resources across multiple computing clouds, cause the computer to perform operations comprising:
storing, by a multi-computing cloud orchestrator, an information record comprising at least one of a list of available resources of a plurality of computing environments, a cost of using each available resource, or an expected performance level of each available resource;
receiving, by the multi-computing cloud orchestrator, information associated with an application, the information including a regulatory compliance requirement;
allocating, by the multi-computing cloud orchestrator, a resource pool to be used for executing the application based on the information record, the resource pool comprising a first resource from a computing cloud and a second resource from a computing cluster of the plurality of computing environments, one of the first resource and the second resource operating within the regulatory compliance requirement;
generating and installing, on a device local to the second resource, a resource interface to receive and translate provisioning requests for the second resource; and
provisioning, by the multi-computing cloud orchestrator, the first resource and the second resource to execute the application, comprising:
receiving a first request to provision the first resource and a second request to provision the second resource, at least one of the first request or the second request including performance criteria for selecting a resource;
accessing cloud information records to identify a plurality of resources of the computing cloud and the computing cluster fulfilling the performance criteria;
translating the first request into a format suitable for use by the computing cloud; and
translating the second request into a format suitable for use by the computing cluster, the translated format of the first different than the translated format of the second request;
wherein one of the translated first request or translated second request includes a resource identifier for the resource fulfilling the performance.

16. The non-transitory computer-readable medium of claim 15, storing additional instructions which, when executed by the computer, cause the computer to perform additional operations comprising provisioning the first resource using a cloud portal, the format of the first request comprising an interface format of the cloud portal.

17. The non-transitory computer-readable medium of claim 15, storing additional instructions which, when executed by the computer, cause the computer to perform additional operations comprising allocating a third resource of a second computing cluster to be included in the resource pool and provisioning the third resource to execute the application, the third resource provisioned according to a third request to provision the third resource, the format of the third request comprising an interface format of the second computing cluster.

18. The non-transitory computer-readable medium of claim 17, storing additional instructions which, when executed by the computer, cause the computer to perform additional operations comprising communicating with the third resource using a web-based interface comprising the interface format.

19. The non-transitory computer-readable medium of claim 17, storing additional instructions which, when executed by the computer, cause the computer to perform additional operations comprising communicating with the third resource using an element manager, the interface format comprising the interface format of the element manager.

20. The non-transitory computer-readable medium of claim 19, storing additional instructions which, when executed by the computer, cause the computer to perform additional operations comprising identifying the third resource using resource information specified in the third request, the resource information comprising unique identifying information associated with the third resource.

* * * * *